(12) United States Patent
Qiu et al.

(10) Patent No.: US 7,800,352 B2
(45) Date of Patent: Sep. 21, 2010

(54) CONTROLLER HAVING COMP NODE VOLTAGE SHIFT CANCELLATION FOR IMPROVED DISCONTINUOUS CONDUCTION MODE (DCM) REGULATOR PERFORMANCE AND RELATED METHODS

(75) Inventors: Weihong Qiu, San Jose, CA (US); Robert Isham, Flemington, NJ (US)

(73) Assignee: Intersil Americas Inc., Milpitas, CA (US)

( * ) Notice: Subject to any disclaimer, the term of this patent is extended or adjusted under 35 U.S.C. 154(b) by 185 days.

(21) Appl. No.: 11/879,074

(22) Filed: Jul. 16, 2007

(65) Prior Publication Data
US 2008/0284398 A1 Nov. 20, 2008

Related U.S. Application Data

(60) Provisional application No. 60/938,316, filed on May 16, 2007.

(51) Int. Cl.
*G05F 1/575* (2006.01)

(52) U.S. Cl. .................... 323/284; 323/285; 323/351

(58) Field of Classification Search ................. 323/265, 323/282, 283, 284, 285, 351, 288
See application file for complete search history.

(56) References Cited

U.S. PATENT DOCUMENTS

| 7,245,113 | B2* | 7/2007 | Chen et al. ................ 323/271 |
| 7,279,870 | B2* | 10/2007 | Hasegawa et al. ........... 323/224 |
| 7,453,250 | B2* | 11/2008 | Qiu et al. .................... 323/288 |
| 7,595,617 | B2* | 9/2009 | Schiff ........................ 323/282 |

* cited by examiner

*Primary Examiner*—Gary L Laxton
(74) *Attorney, Agent, or Firm*—Fogg & Powers LLC

(57) ABSTRACT

A modulation controller includes an error amplifier which receives a reference voltage and an output voltage ($V_{OUT}$) from a switching regulator being controlled by the controller at its inputs and provides a $V_{COMP}$ signal at its output, and at least one comparator, wherein a first input of the comparator is coupled to an output of the error amplifier and a second input coupled to receive a ramp signal. A $V_{COMP}$ shift cancellation circuit is interposed between the first or second input of the comparator, wherein the $V_{COMP}$ shift cancellation circuit improves diode conduction mode performance (DCM) of the regulator by reducing a variation in average $V_{COMP}$.

16 Claims, 11 Drawing Sheets

(a). BLOCK DIAGRAM (b). OPERATIONAL WAVEFORMS

BLOCK DIAGRAM

OPERATIONAL WAVEFORMS

CONTROLLER HAVING COMP NODE VOLTAGE SHIFT CANCELLATION FOR IMPROVED DISCONTINUOUS CONDUCTION MODE (DCM) REGULATOR PERFORMANCE AND RELATED METHODS

CROSS-REFERENCE TO RELATED APPLICATIONS

This application claims the benefit of Provisional Application No. 60/938,316 entitled "SWITCHING REGULATOR HAVING VOLTAGE SHIFT CANCELLATION FOR IMPROVED DISCONTINUOUS CONDUCTION MODE (DCM) PERFORMANCE AND RELATED METHODS" filed on May 16, 2007, which is incorporated by reference in its entirety into the present application.

FIELD OF THE INVENTION

The present invention relates to switching regulators and, in particular, to regulator controllers and associated control schemes for switching to discontinuous conduction mode (DCM) at low load current operation to optimize efficiency.

BACKGROUND OF THE INVENTION

A conventional control scheme for switching regulators is pulse-width modulation (PWM). PWM control uses a constant switching frequency, but varies the duty cycle as the load current varies. This scheme generally achieves good regulation, low noise spectrum, and high power efficiency. However, when the load current is low the PWM mode is known to be inefficient due to primarily switching loss and high quiescent current. It is known that by adjusting the switching frequency according to the load current, the power efficiency at light load can be improved.

In one improved arrangement, the converter normally operates in continuous-conduction-mode (CCM), and automatically enters discontinuous conduction mode (DCM) at low load for optimum efficiency. DCM is also known as pulse frequency modulation (PFM) or Diode Emulation Mode (DEM). In CCM the converter operates as a synchronous rectifier. In DEM the low-side MOSFET stays off, blocking negative current flow from the output inductor.

FIG. 1 shows operation under DCM for load currents up to I_Critical (referred to herein as low load conditions), and CCM for load currents at or above I_Critical (referred to herein as heavy load conditions). Under CCM the converter operates with a constant duty cycle (D). Under DCM, the duty cycle is adjusted according to the load current.

For linear control schemes, the duty cycle is determined by the error amplifier output voltage $V_{COMP}$. As noted above, for CCM operation, the duty cycle is constant, so $V_{COMP}$ is held constant. Under DCM, the $V_{COMP}$ level is adjusted to obtain different duty cycles according to load condition. The $V_{COMP}$ voltage shift in the DCM mode deteriorates the performance and introduces extra voltage deviation. Mode transitioning waveforms (between CCM and DCM) is shown in FIG. 2(a), while load transient waveforms are shown in FIG. 2(b).

FIG. 2(a) demonstrates that there exists significant $V_{OUT}$ deviation when the converter switches from the synchronous CCM operation at heavy load to DCM at light load, as well as from DCM at light load to CCM at heavy load. FIG. 2(b) demonstrates the load transient performance for $V_{OUT}$ at DCM ($t_3$ to $t_5$) is not be as good as at CCM ($t_0$ to $t_2$). What is needed is a controller circuit architecture or methodology to achieve the similar performance at both CCM and DCM conditions, and which limits voltage deviation when the converter switches between synchronous CCM operation at heavy load to DCM at light load.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A modulation controller includes an error amplifier which receives a reference voltage and an output voltage ($V_{OUT}$) from a switching regulator being controlled by the controller at its inputs and provides a $V_{COMP}$ signal at its output, and at least one comparator, wherein a first input of the comparator is coupled to an output of the error amplifier and a second input is coupled to receive a ramp signal. A $V_{COMP}$ shift cancellation circuit is interposed between the first or second input of the comparator, wherein the $V_{COMP}$ shift cancellation circuit improves diode conduction mode performance (DCM) of the regulator by reducing a variation in average $V_{COMP}$. The controller can comprise a pulse timing circuit, wherein an output of the comparator is coupled to a first input of the pulse timing circuit, a second input of the pulse timing circuit being coupled to receive a timing signal, wherein an output of the pulse timing circuit provides a modulation signal. The pulse timing circuit can comprise a Set-Reset (SR) flip-flop.

In one embodiment, the $V_{COMP}$ shift cancellation circuit comprises a summing node, wherein the summing node receives the $V_{COMP}$ signal and an adaptive $V_{COMP}$ offset voltage signal and outputs an adjusted $V_{COMP}$ signal. In this embodiment the adaptive $V_{COMP}$ offset voltage signal can be based on a difference in duty cycle ($\Delta D$) between a duty cycle while the regulator being controlled is in discontinuous conduction mode (DCM) and the duty cycle while the regulator being controlled is in continuous-conduction-mode (CCM). In one embodiment the adaptive $V_{COMP}$ offset voltage signal is generated by multiplying a peak-to-peak (pk-pk) voltage of the ramp signal with $\Delta D$. $\Delta D$ can be generated from a duration during DCM that there is zero inductor current. $\Delta D$ can be obtained by ratioing the duration having zero inductor current by a total inductor conduction duration.

The $V_{COMP}$ shift cancellation circuit can be interposed between the ramp signal and the second input of the comparator. In this embodiment the ramp signal can be an up-ramp signal, wherein the $V_{COMP}$ shift cancellation circuit provides a current source which implements ramp slew rate adjustment for the up-ramp signal.

In another embodiment, the $V_{COMP}$ shift cancellation circuit comprises a voltage divider. In this embodiment, a divider ratio of the voltage divider is adjusted based on a conduction duration of inductor current provided by the switching regulator.

A switching regulator comprises modulation controller comprising an error amplifier which receives a reference voltage and an output voltage of the regulator ($V_{OUT}$) controlled by the controller at its inputs and provides a $V_{COMP}$ signal at its output, at least one comparator, a first input of the comparator coupled to an output of the error amplifier and a second input coupled to receive a ramp signal. A $V_{COMP}$ shift cancellation circuit is interposed between the first or second input of said comparator, wherein the $V_{COMP}$ shift cancellation circuit reduces a variation in average $V_{COMP}$. The modulation controller also includes a pulse timing circuit, wherein an output of the comparator is coupled to a first input of the pulse timing circuit, a second input of the pulse timing circuit is coupled to receive a timing signal, an output of said pulse timing circuit providing a modulation signal. At least one driver has an input coupled to receive the modulation signal and an input to receive a mode select signal, the mode select signal causing the driver to determine whether said regulator is in discontinuous conduction mode (DCM) or continuous-conduction-mode (CCM), and an output stage comprising at least one output transistor having an input coupled to an output of said driver. The output transistor is adapted for driving an inductor in series with a grounded capacitor, wherein $V_{OUT}$ is at a node between said inductor and the capacitor, $V_{OUT}$ generating a load current across a load when connected across the capacitor.

In one embodiment the $V_{COMP}$ shift cancellation circuit comprises a summing node, wherein the summing node receives the $V_{COMP}$ signal and an adaptive $V_{COMP}$ offset voltage signal and outputs and adjusted $V_{COMP}$ signal. In this embodiment the adaptive $V_{COMP}$ offset voltage signal can be based on a difference in duty cycle (ΔD) between a duty cycle while the regulator is in DCM and the duty cycle while said regulator is in CCM.

A method of controlling a voltage regulator to improve discontinuous conduction mode (DCM) performance comprises the steps of providing a modulation controller having an error amplifier which receives a reference voltage and an output voltage ($V_{OUT}$) from a regulator being controlled by the controller at its inputs and provides a $V_{COMP}$ signal at its output, and at least one comparator, a first input of said comparator coupled to an output of the error amplifier and a second input coupled to receive a ramp signal. During operation of the regulator the regulator switches between DCM and continuous-conduction-mode (CCM), $V_{COMP}$ shift cancellation is performed while in DCM to reduces a variation in average $V_{COMP}$ during DCM. The performing $V_{COMP}$ shift cancellation step can comprise generating an offset voltage based on a duty cycle difference between CCM and DCM and adding the offset voltage to the $V_{COMP}$ signal. In another embodiment the performing $V_{COMP}$ shift cancellation step comprises adjusting a slew rate of the ramp signal. In another embodiment, the performing $V_{COMP}$ shift cancellation step comprises the steps of obtaining a ratio of a duty cycle in DCM and a duty cycle in CCM, and generating a divider ratio adjustment for the $V_{COMP}$ signal using the ratio.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION $V_{COMP}$ shift cancellation circuits according to the present invention have been found by the present Inventors to provide improved modulation controllers and regulators therefrom which maintain a more constant average $V_{COMP}$ at the output of the error amplifier. As a result of maintaining a more constant average $V_{COMP}$, similar performance is obtained during both forced continuous-conduction-mode (referred to herein as CCM) operation, and Diode Emulation Mode (referred to herein as DCM) operation, including under DCM in the presence of significant load current transients. Moreover, the $V_{COMP}$ shift cancellation circuits according to the invention have been found to significantly reduce Vout deviation when switching regulators controlled by modulation controllers according to the present invention switch between synchronous CCM operation at heavy load and DCM operation at light load.

Figure 1:
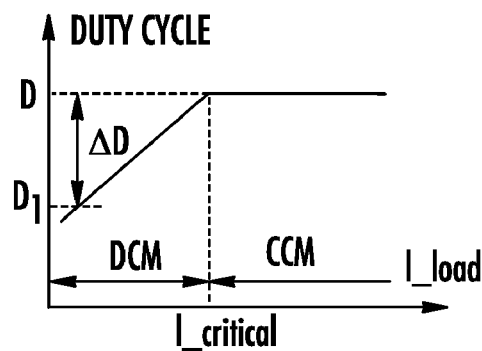
FIG. 1 shows a plot of duty cycle (D) vs. load current (I) showing both DCM (varying duty cycle) and CCM (constant duty cycle).
Figure 2A:
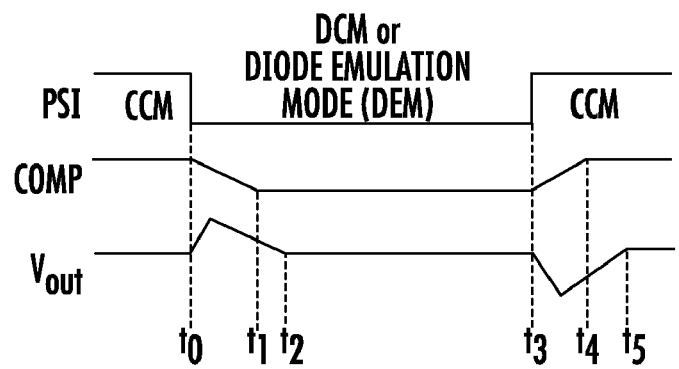
FIGS. 2(a) and (b) demonstrate the COMP level shift and associated $V_{OUT}$ deviation due to mode transitioning between DCM and CCM, and load transient performance for $V_{OUT}$ at DCM and CCM showing sluggish relative DCM performance, respectively.
Figure 2B:
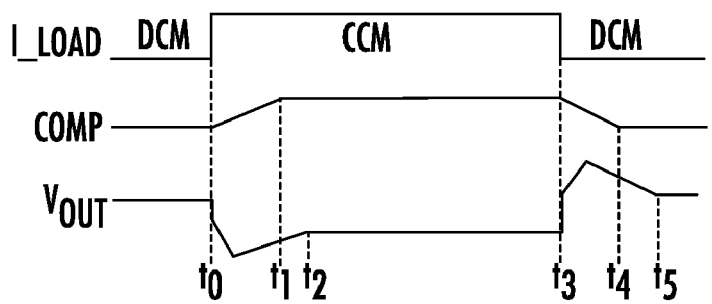
Figure 3A:
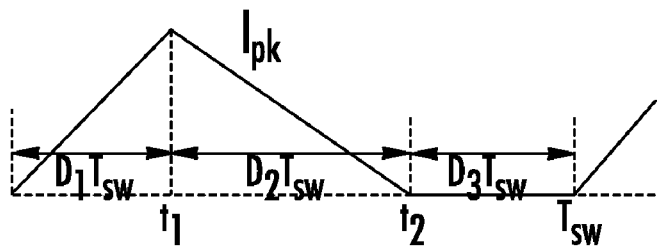
FIGS. 3(a) and (b) are output inductor current waveforms at different load conditions for regulator operation under DCM and CCM, respectively.
Figure 3B:
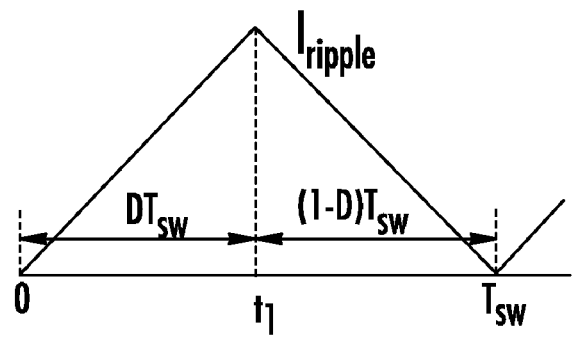

Realization of the present invention involved the present Inventors examining DCM and CCM inductor current waveforms, and comparing them. FIG. 3(a) shows inductor current under DCM operation. It can be seen that there exists one time interval (shown as $D_3T_{SW}$) with zero inductor current at the DCM condition (D is the duty cycle). Other time intervals in DCM shown in FIG. 3(a) are at $D_1$ ($D_1T_{SW}$) and $D_2$ ($D_2T_{SW}$), both corresponding to a non-zero inductor current. $D_1$, $D_2$ and $D_3$ are generally all different duty cycles. As seen in FIG. 3(b) which shows inductor current during CCM operation, no such interval with zero inductor current exists at the CCM condition, and the duty cycle is a constant duty cycle (D), as it should be for CCM. The zero inductor current interval $D_3$ during DCM operation has been found by the present Inventors to be the primary cause for the degraded performance while in DCM as compared to CCM operation.

In the following analysis, L is the inductance of the switching regulator's inductor which conducts the inductor current, and the parasitic parameters in the Buck converter are ignored, such as $R_{ds,on}$ and the DC resistance of the inductor. The following equations are obtained:

$$I_{Ripple} = \frac{V_{IN} - V_O}{L_O} DT_{sw} = \frac{1-D}{L_O} V_O T_{sw} \quad (1)$$

$$I_{Pk} = \frac{V_{IN} - V_O}{L_O} D_1 T_{sw} = \frac{V_O}{L_O} D_2 T_{sw} \quad (2)$$

$$\frac{V_O}{V_{IN}} = D = \frac{D_1}{D_1 + D_2} \quad (3)$$

$$\frac{D_1}{D} = D_1 + D_2 \quad (4)$$

The difference in the duty cycle (ΔD) between DCM and CCM is given by:

$$\Delta D = D - D_1 \quad (5)$$
$$= \frac{I_{Ripple} - I_{Pk}}{I_{Pk}} D_1$$
$$= \frac{D_1}{D_1 + D_2} - D_1$$
$$= \frac{D_1 D_3}{D_1 + D_2}$$
$$= \frac{V_o}{V_{in}} D_3$$

Based on the above equations, there are several ways to cancel the $V_{COMP}$ shift while in DCM. One way is to add an offset voltage with $V_{COMP}$ to adjust the voltage fed to the modulator, while maintaining the $V_{COMP}$ almost constant. Other $V_{COMP}$ shift cancellation circuit schemes described below include ramp slew rate adjustment and COMP signal divider ratio adjustment.

Figure 4A:
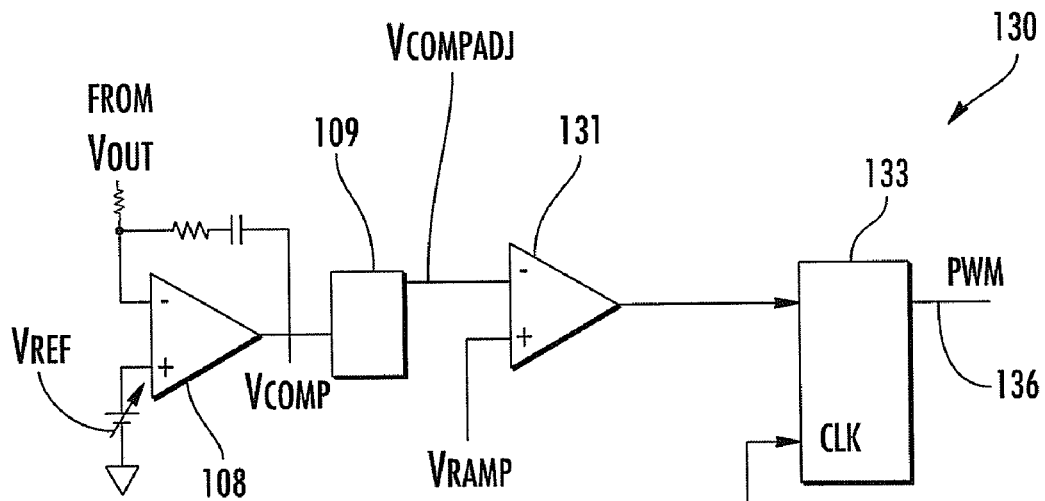
FIG. 4(a) shows the schematic of an exemplary modulation controller according to an embodiment of the present invention based on $V_{COMP}$ shift cancellation comprising a $V_{COMP}$ shift cancellation circuit interposed between the error amplifier and the modulator.

FIG. 4(a) shows the schematic of an exemplary modulation controller according to an embodiment of the present invention based on generating an adjusted $V_{COMP}$, referred to herein as $V_{COMPADJ}$. Controller 130 includes error amplifier 108 which has a reference voltage Vref applied to its non-inverting input and the output (Vout) from an associated switching regulator (not shown) that is controlled by the PWM output of controller 130 shown at node 136. The output of error amplifier is referred to as the COMP node having the voltage $V_{COMP}$ shown. The COMP node is coupled to comp voltage shift cancellation circuit according to the present invention 109. Controller 130 also includes a comparator 131 having one input coupled to output of comp voltage shift cancellation circuit 109 ($V_{COMPADJ}$), and one input coupled to a ramp signal, shown as $V_{Ramp}$.

Figure 8A:
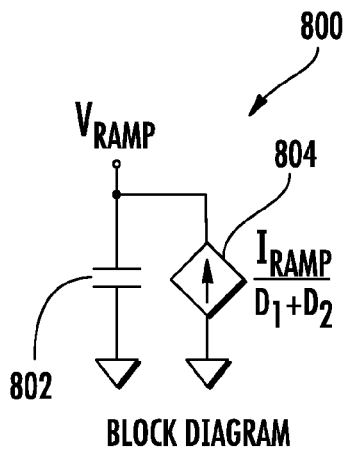
FIGS. 8(a) and (b) show a block diagram and operational waveforms for a ramp slew rate adjustment for the up_ramp signal based on $D_1+D_2$, respectively.
Figure 8B:
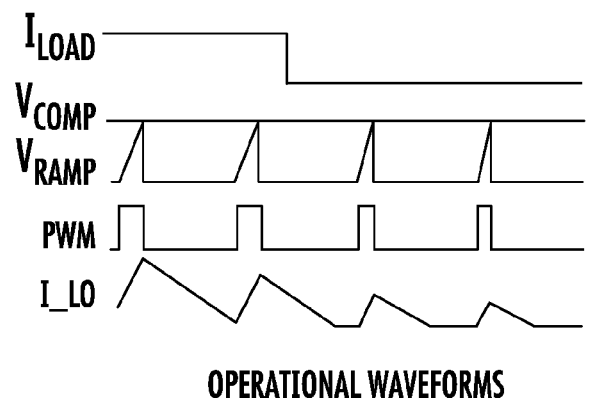
Figure 10A:
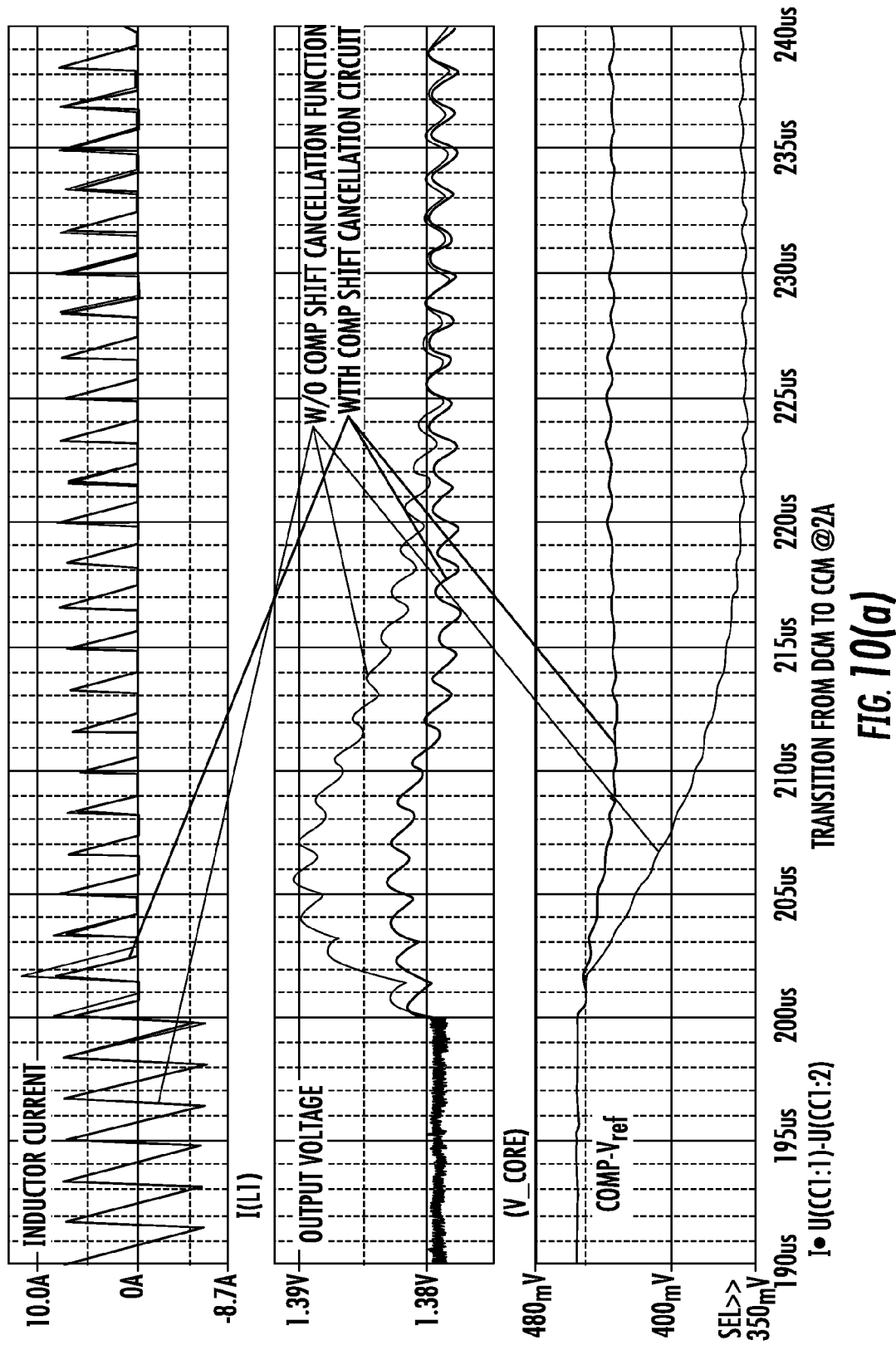
FIG. 10 is simulation data showing the transition between CCM to DCM and DCM and CCM, respectively, both operating at an output current of 2 A.
Figure 10B:
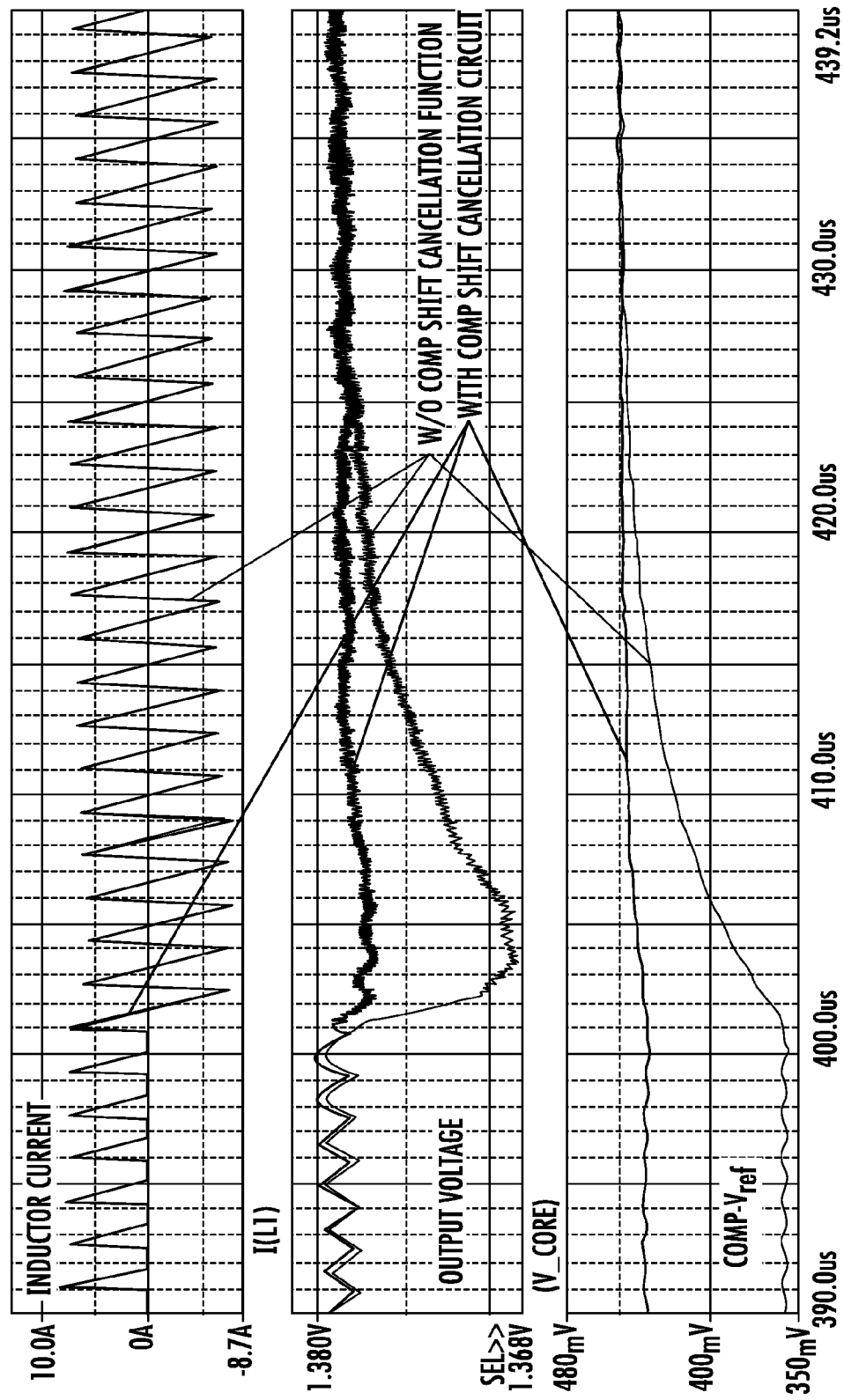

Voltage shift cancellation circuit 109 keeps $V_{COMP}$ almost constant, for example as shown in FIG. 8(b) and FIGS. 10(a) and (b) described below at essentially all load conditions, which results in achieving similar regulator performance at both CCM and DCM conditions. The output of comparator 131 is coupled to an input of pulse timing circuit 133, with another input (e.g. clock input) of pulse timing circuit being coupled to a timing signal. As known in the art, a pulse timing circuit, such as a set-reset (SR) flip-flop is often coupled to the output of the comparator to ensure there is only one pulse for each switching cycle. The PWM output of pulse timing circuit 133 along with a mode signal (e.g. 0 or 1) are inputs to a mode select driver (see FIG. 4(c)) which provides a mode select signal that when coupled to output driver circuitry (See driver 118 in FIG. 4(c)) determines the operational mode (DCM or CCM) of the switching regulator (again, see FIG. 4(c). The mode select signal can be the PSI signal. Typically the controller will generate its own signal to represent the PSI status for the driver For example, when Mode input=0, mode select driver 114 shown in FIG. 4(c) provides a signal that runs the associated regulator in DCM under light load condition and CCM at heavy load and DCM, while when Mode=1, the regulator is run in forced CCM.

The present invention can be applied to a variety of conventional modulator schemes based on single PWM comparators and single ramp signals, including leading edge, trailing edge modulators and dual edge modulation schemes. For example, the leading-edge modulation scheme is generally good for the load-adding transient event but not always responsive to a load-releasing transient. In a trailing-edge modulation scheme, each PWM pulse is initiated synchronous with a clock signal and terminated based on the comparator output. The trailing-edge modulation scheme is generally good for the load-releasing transient event but not always responsive to a load-adding transient event. In a conventional dual-edge modulation scheme, the ramp is a triangular waveform so that each PWM pulse begins and ends based on a comparison of the triangular waveform with the compensation signal. As described below, the invention can be used with other generally more complex modulation schemes, including dual edge modulation using dual ramps disclosed in related published application No. 20070013356 entitled "PWM controller with dual-edge modulation using dual ramps" by Qiu et al, which is incorporated by reference into the present application in its entirety.

Figure 4B:
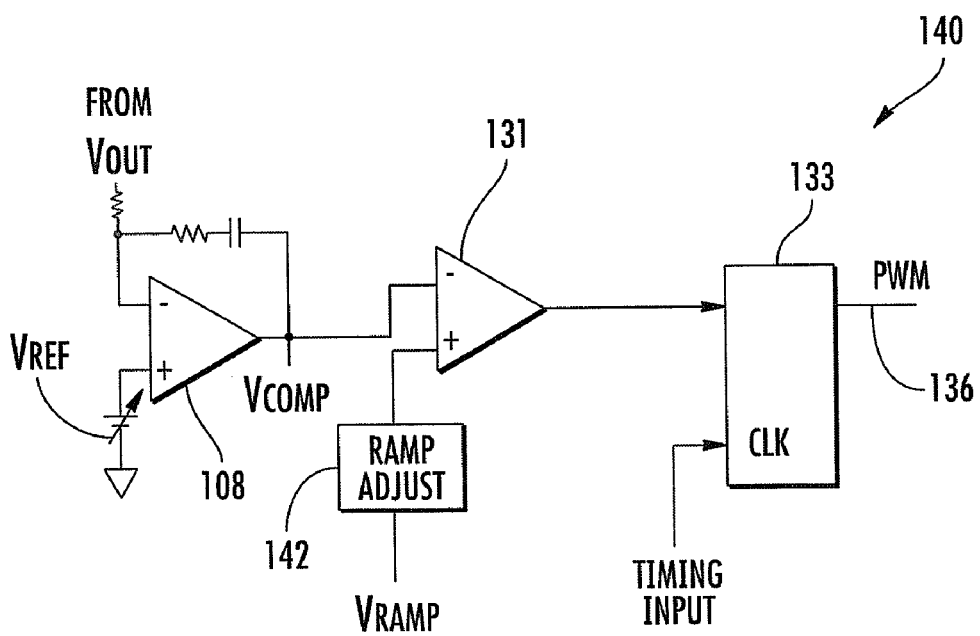
FIG. 4(b) shows the schematic of an exemplary modulation controller according to an embodiment of the present invention which implements $V_{COMP}$ shift cancellation based on ramp slew rate adjustment.

FIG. 4(b) shows the schematic of an exemplary modulation controller 140 according to an embodiment of the present invention based on ramp slew rate adjustment. Compared to controller 130 shown in FIG. 4(a), controller 140 replaces comp voltage shift cancellation circuit 109 with a ramp adjust circuit 142 which adjusts the slew rate of a $V_{Ramp}$ signal received comparator 131 to obtain the duty cycle at DCM with an essentially constant $V_{COMP}$ signal.

Figure 4C:
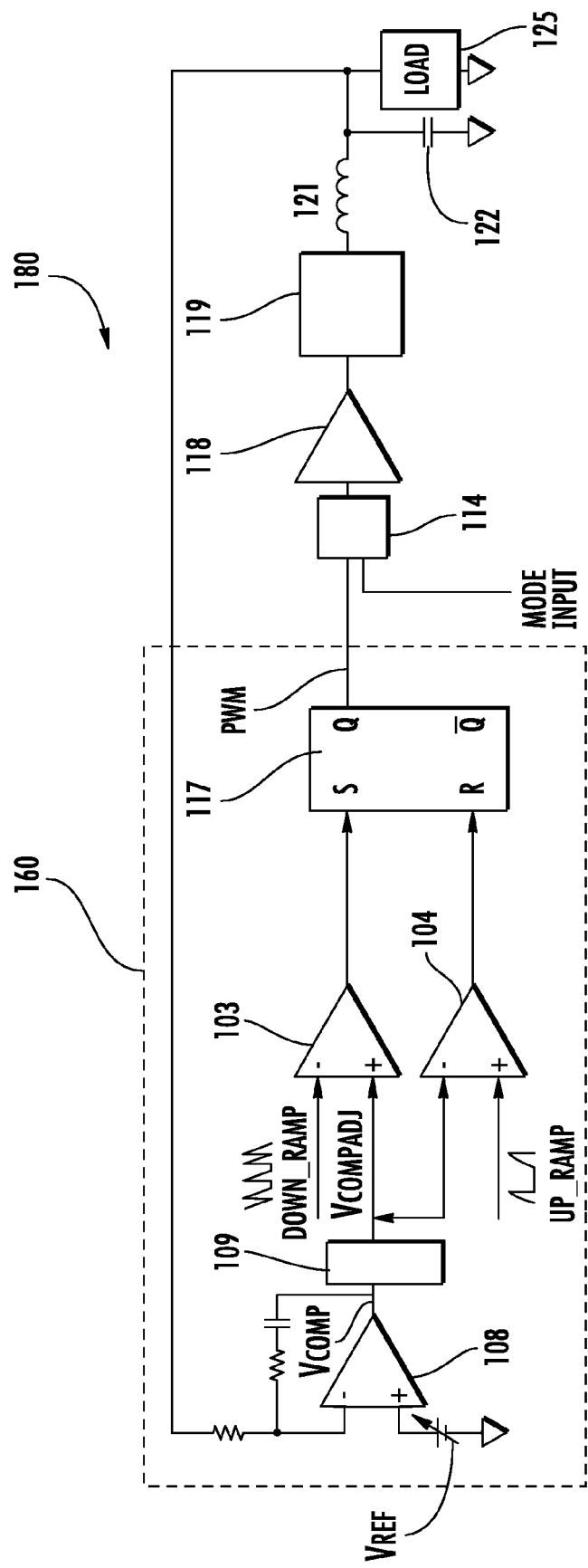
FIG. 4(c) shows the schematic of an exemplary switching regulator according to the invention comprising a modulation controller based on dual-edge modulation using dual ramps including a $V_{COMP}$ shift cancellation circuit.

FIG. 4(c) shows the schematic of an exemplary switching regulator 180 according to an embodiment of the invention including a modulation controller 160 based on COMP voltage shift cancellation shown in FIG. 4(a) and dual-edge modulation using dual ramps. Controller 160 includes error amplifier 108 which has a reference voltage Vref applied to its non-inverting input and the regulator output (Vout) feed back to its inverting input, having output COMP ($V_{COMP}$ shown as the voltage at the COMP node). The COMP node is coupled to comp voltage shift cancellation circuit 109 as described above, which receives $V_{COMP}$ from E/A 108 and outputs $V_{COMPADJ}$. Modulation controller 160 comprises a dual comparator (103 and 104) having inputs coupled to outputs of comp voltage shift cancellation circuit 109. Comparator 103 also receives a down_ramp signal from a down-ramp generator (not shown) while comparator 104 receives an up-ramp signal from an up-ramp generator (not shown). The down ramp signal generated decreases linearly from its peak value to its valley value. When the down ramp signal intersects with adjusted $V_{COMP}$ signal, shown as $V_{COMPADJ}$, comparator 103 will generate a pulse to turn on modulator 110. When the up_ramp signal intersects with the $V_{COMPADJ}$ signal, the output of comparator 104 changes to high which will terminate the PWM signal (pull the PWM node to low).

As noted above, voltage shift cancellation circuit 109 keeps $V_{COMP}$ almost constant at all load conditions, and as a result, achieves similar performance at both CCM and DCM conditions. Based on the simulation results and small signal modeling described in the Examples section described below, the present Inventors have verified that keeping $V_{COMP}$ almost constant is the key to boosting DCM performance. Comp voltage shift cancellation circuit 109 can be implemented using several different circuits and related circuits and methods such as slew ramp adjust which each maintain an essentially constant voltage at $V_{COMP}$.

The outputs of comparators 103 and 104 are shown coupled to a pulse timing circuit shown as a SR flip-flop (or "latch") 117. For SR Flip flops, when S=0 and R=1, Q=0; while when S=1 and R=0, Q=1; when S=R=0, the current state is kept. The output of SR flip-flop 117 which provides the controller's PWM signal is coupled to mode select driver 114 which is coupled to output driver 118. Output driver 118 drives synchronous (upper and lower) output switches 119, shown driving a low pass filter comprising inductor 121 and capacitor 122, with load 125 taken across capacitor 122. Mode select driver 114 and output driver 118 can be combined in a single device, and referred to as a "DEM driver".

In one embodiment, load 125 is a microprocessor. When load 125 is a microprocessor, the microprocessor generally includes a mode select signal which can be used as an external triggering signal, which is generally in one of two states indicative of the load current drawn. For example, when the microprocessor CPU senses the load current being heavy, the mode select can be in the "1" state. When the CPU senses the load current being light, such as below a predetermined current threshold set on the microprocessor, the mode select output can be in the "0" state. For INTEL® microprocessors, the mode select signal is referred to as a "PS1 signal".

The mode select signal can also be generated by another system power management controller, or the regulator controller itself (e.g. by sensing the load current). For example, if the load current is less than the threshold for a predetermined amount of time, the regulator can automatically enter DCM.

When a mode select signal is available from the load 125, other controllers or the regulator controller itself, the mode select signal can be coupled back to the modulator 110. In such embodiments, the regulator 100 does not need to sense the load current to implement mode switching according to the invention. The modulator 110 can change between the operation modes based on this signal, such as normal PWM operation for high current and DCM operation for low current as described below.

The ramp adjust embodiment shown in FIG. 4(b) can be applied to a switching regulator, such as regulator 180 shown in FIG. 4(c), instead of comp voltage shift cancellation circuit 109. In such an embodiment, a ramp voltage adjust circuit, such as ramp adjust circuit 142 shown in FIG. 4(b) can be used to adjust the up-ramp signal waveform which is an input to comparator 104.

1. COMP Offset Scheme

The difference in duty cycle between DCM and CCM (ΔD) can be calculated based on Eq. (5) above. Assuming the peak-to-peak (pk-pk) voltage of the ramp signal is $V_{PP}$, the offset voltage needed to maintain a constant COMP voltage is given by:

$$V_{COMP\_OFFSET} = \Delta D \cdot V_{PP} \quad (6)$$

Figure 5:
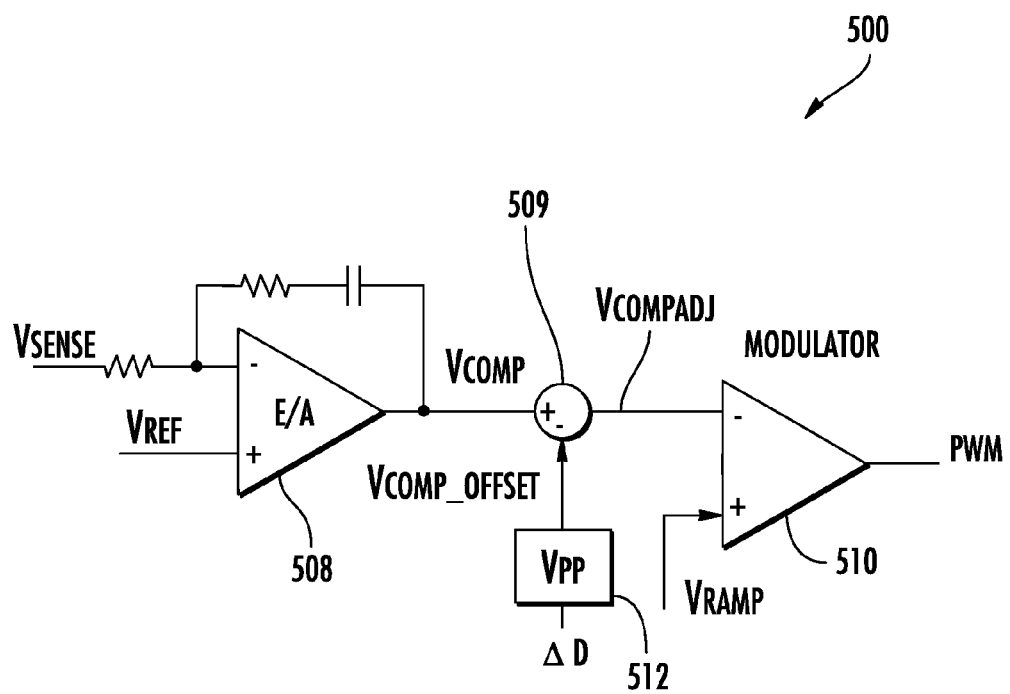
FIG. 5 shows a modulation controller according to an embodiment of the present invention implementing an adaptive offset voltage scheme for canceling, or at least substantially reducing, the $V_{COMP}$ shift at DCM.

The calculated offset voltage ($V_{COMP\_OFFSET}$) can be added to the COMP signal using a summing node arrangement, as shown in the modulation controller block diagram 500 shown in FIG. 5. Modulation controller includes error amplifier 508, summing node 509 and modulator/comparator 510. Block 512 provides offset voltage ($V_{COMP\_OFFSET}$) by multiplying $V_{PP}$ and ΔD. Summing node 509 adds $V_{COMP\_OFFSET}$ to $V_{COMP}$ to generate the desired $V_{COMPADJ}$, which is fed to the inverting input of modulator 510. Since $V_{COMP}$ OFFSET is proportional to difference in duty cycle (ΔD) between the duty cycle while in DCM (which is a function of load current) and the fixed duty cycle in CCM, $V_{COMPADJ}$ generated by subcircuit 500 is dynamically adjusted according to the load at DCM, so that $V_{COMP}$ is kept essentially constant (left unchanged). There are a plurality of methods available to calculate the duty cycle difference (ΔD). For example, the inductor current ripple during a PWM ON pulse interval can be measured. With measured $I_{pk}$ and $I_{ripple}$ values, the duty cycle difference (ΔD) can be obtained by $D_T*(I_{ripple}-I_{ripple})/I_{pk}$. Below list several exemplary methods for calculating the duty cycle difference (ΔD).

1(a) $V_{COMP}$ Offset Calculation Based on $D_3$

The duty cycle difference (ΔD) can also be obtained by measuring the duration of $D_3$, which as shown in FIG. 3(a) is the zero inductor current interval during DCM. Once $D_3$ is known, the offset voltage ($V_{COMP\_OFFSET}$) can be calculated by:

$$V_{COMP\_OFFSET} = \Delta D \cdot V_{PP} = \frac{V_o}{V_{in}} D_3 V_{PP} \quad (7)$$

Figure 6:
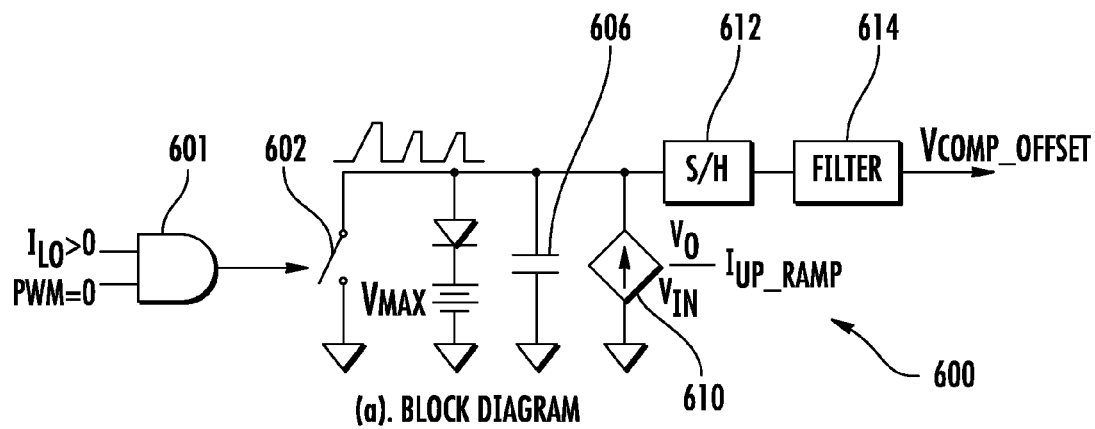
FIGS. 6(a) and (b) shows block diagram and operational waveforms for COMP offset calculation based on D3, respectively.
Figure 6:
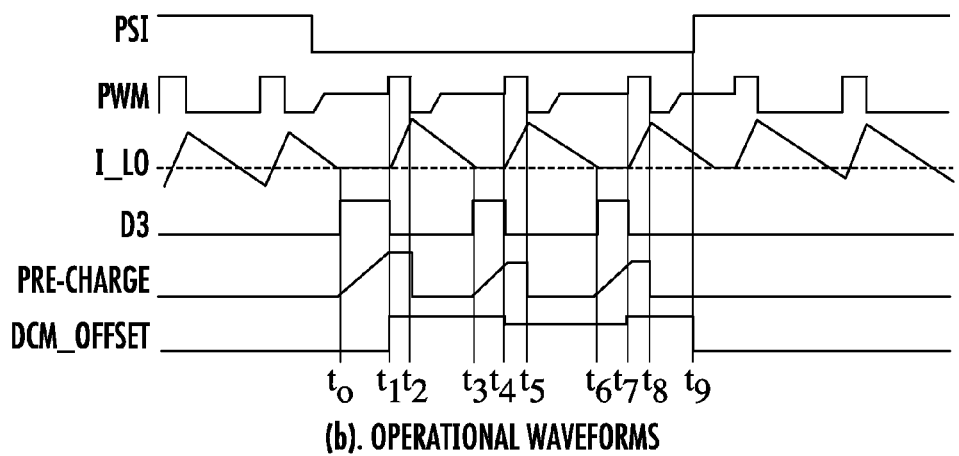

As shown in subcircuit block diagram 600 shown in FIG. 6, subcircuit 600 implements a one scheme to obtain the offset voltage according to the ratio of input/output voltage and $D_3$. The output of subcircuit 600 can be used as an input to the summing node 509 shown in FIG. 5 to be summed with $V_{COMP}$. Subcircuit 600 comprises AND gate 601, switch 602, capacitor 606 current source 610, sample and hold (S/H) 612 and filter 614. Inputs to AND gate 601 include "PWM" which represents the output of the modulator and the inductor current. Vmax is designed to limit the maximum offset for $V_{COMP}$ adjustment to avoid certain special cases, such as pushing the duty cycle to 0. The diode together with Vmax provide a voltage clamp circuit.

FIG. 6(b) shows operation waveforms for a regulator which comp voltage shift cancellation is implemented with subcircuit 600 which provides offset calculation based on D3 implemented in a buck regulator that drives a microprocessor which includes PS1 signaling. When PS1 is high, the operation is CCM and subcircuit 600 does not provide any function. When PS1 is low, the regulator is in DCM, with intervals in DCM in duty cycle D3. D3 has zero inductor current. During DCM, (ΔD) is shown as DCM_offset. When the inductor current $I_{LO}$ drops to zero, i.e. the $D_3$ interval, capacitor 606 is charged by current source 610 which provides a current that is proportional to the ratio of $V_{OUT}$ to $V_{IN}$. When the output of the modulator goes high, the current source 610 stops charging capacitor 606 and the voltage across the capacitor 606 (pre-charge) is sampled by S/H 612. The sampled voltage (DCM_offset) goes through a low pass filter 614 before it is added as $V_{COMP\_OFFSET}$ to the COMP signal. When PS1 returns to high, the regulator operation returns to CCM.

1(b) $V_{COMP}$ Offset Calculation Based on $D_1$ & $D_2$

The following equation can be used to obtain $V_{COMP\_OFFSET}$:

$$V_{COMP\_OFFSET} = \Delta D \cdot V_{PP} = \frac{1 - D_1 - D_2}{D_1 + D_2} D_1 V_{PP} \qquad (8)$$

Figure 7:
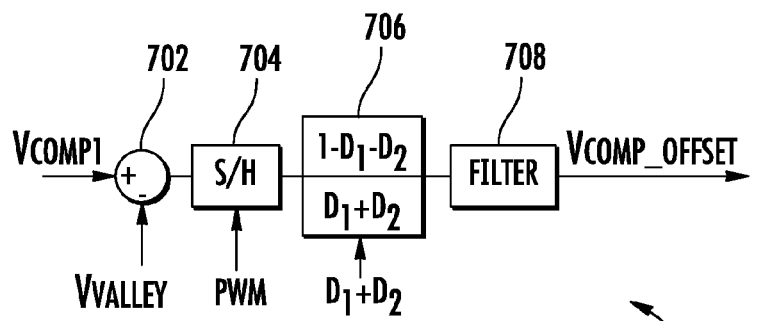
FIG. 7 shows a COMP offset calculation circuit according to an embodiment of the present invention based on $D_1+D_2$.

Refer to FIG. 3(a) for definitions of the duty cycle intervals while in DCM, namely $D_1$, $D_2$ and $D_3$. $D_1 V_{pp}$ is equal to the ramp signal voltage at PWM falling edge, which is also equal to the $V_{COMP1}$ voltage at PWM falling edge (assumes that the valley voltage of the ramp signal is 0). As shown in subcircuit block diagram 700 shown in FIG. 7, subcircuit 700 which comprises summing node 702, sample and hold (S/H) 704, multiplier 706 and low pass filter 708, implements a scheme which using S/H 704 samples this voltage $V_{PP}$ and using multiplier 706 multiplies $V_{PP}$ by duration D1 multiplied the ratio of the no-current duration ($D_3 = 1 - D_1 - D_2$) over the total conduction duration ($D_1 + D_2$). $V_{Valley}$ refers to the minimum voltage of the ramp signal, while PWM shown corresponds to the modulation controller output. The output of subcircuit 700 can be used as an input to the summing node 509 shown in FIG. 5 to be summed with $V_{COMP}$. A high frequency clock signal can be used to provide a count the clock number during the total conduction interval ($D_1 + D_2$). The count number can be used to set up the divider gain for generating $D_1 V_{pp}$ to obtain the desired offset voltage $V_{COMP\_OFFSET}$.

2. Slew Ramp Adjustment Scheme for $V_{COMP}$ Offset Adjustment

FIGS. 8(a) and (b) show a block diagram for a subcircuit 800, and operational waveforms, respectively, for a regulator which is controlled by a modulation controller according to an embodiment of the present invention. The modulation controller for this scheme based on modulation controller 140 shown in FIG. 4(b). Comp voltage shift cancellation is implemented using subcircuit 800 which provides ramp slew rate adjustment shown for the up_ramp signal, shown as $V_{Ramp}$ based on generating a current equal to $I_{Ramp}/D_1 + D_2$. Subcircuit 800 comprises capacitor 802 and current source 804. The current source 804 is used to charge capacitor 802 to generate a ramp signal. Current source 804 provides a current equal to $I_{RAMP}/(D_1 + D_2)$. Therefore the slew rate of the ramp signal is adjusted when the current provided by current source 804 is adjusted. Based on Eq. 4, the ratio between the DCM duty cycle and the fixed CCM duty cycle is proportional to the total conduction interval during DCM which is equal to $D_1 + D_2$. Once the total conduction interval ($D_1 + D_2$) is known, the up_ramp ($V_{Ramp}$) slew rate is adjusted by sub-circuit 800 based on $D_1 + D_2$ to obtain the duty cycle at DCM with a constant $V_{COMP}$ signal.

FIG. 8(b) shows operational waveforms for a regulator utilizing a modulation controller based on subcircuit 800 according to an embodiment of the present invention. $V_{COMP}$ is seen to be held constant whether in CCM ($I_{Load}$ high) or DCM ($I_{Load}$ low).

3. COMP Voltage Divider Scheme

Figure 9:
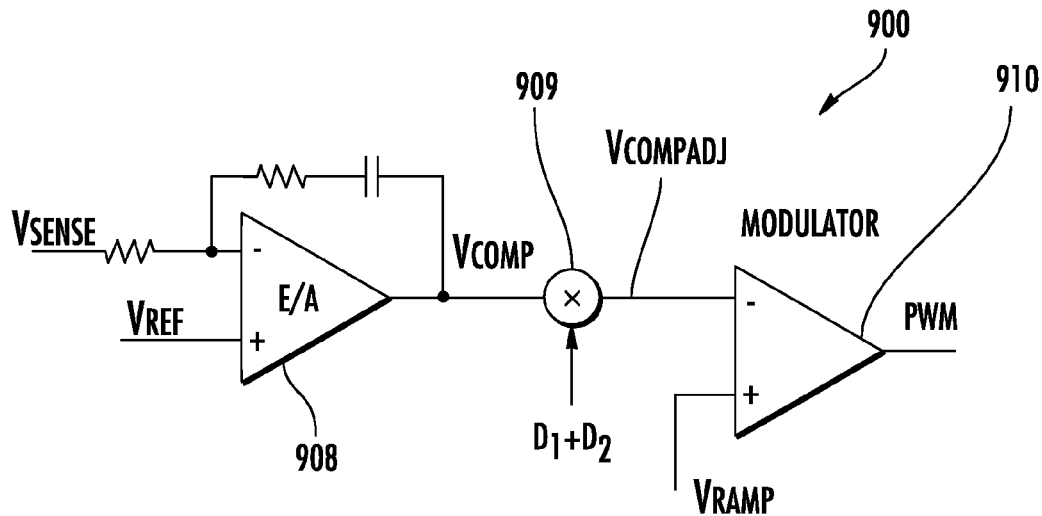
FIG. 9 is a schematic of an exemplary COMP voltage divider scheme according to an embodiment of the present invention.

This embodiment is similar as Scheme #2 described above. Once the ratio of the DCM duty cycle over the fixed CCM duty cycle is known, the divider ratio between $V_{COMP}$ and $V_{COMPADJ}$ for the modulator can be set. FIG. 9 is a schematic of an exemplary modulation controller 900 which implements a COMP voltage divider scheme according to an embodiment of the present invention. Modulation controller 900 comprises error amplifier 908, multiplier 909, and modulator 910.

The reduction in deviation during mode transition between DCM and CCM and improved transient response at DCM provided by the present invention can be used in a variety of modulation controllers and regulator systems. Controllers and regulators that can benefit from the present invention include multiphase controllers and regulators, including both coupled and non-coupled arrangements. As noted above, the present invention can be applied to a variety of conventional modulator schemes based on modulators having single comparators and single ramp signals, including leading edge, trailing edge modulators and dual edge modulation schemes, as well as my complex schemes including dual edge modulation using dual ramp signals.

The slew ramp, COMP voltage offset and COMP voltage divider schemes are described above being used individually to cancel the COMP voltage shift. However, more than one of the respective schemes and related circuitry be combined in one modulation controller.

EXAMPLES

It should be understood that the Examples described below are provided for illustrative purposes only and do not in any way define the scope of the invention.

Mode Transitioning Simulation Data

A synchronous buck voltage regulator is used here only as an example. At light load condition, the system may request the controller to operate at DCM also known as diode emulation mode to provide high efficiency. Under DCM, the lower MOSFET in the synchronous output switch pair is turned off once the inductor current reduces to zero, which is similar to a diode. In response to receiving a request signal at the controller, the controller will transition between CCM and DCM. With a conventional regulator, there exists significant deviations at the output voltage after the mode transitioning. When the synchronous buck voltage regulator is modified to include COMP voltage shift cancellation circuitry according to the present invention embodied as subcircuit 600 shown in FIG. 6 which implements offset calculation based on D3, as seen from the simulation results presented in FIGS. 10(a) and (b), the deviation in $V_{OUT}$ is seen to be significantly reduced.

Control-to-Output Transfer Function Simulation Data

The control-to-output transfer function is known to be different for CCM and DCM operation. At DCM operation, the output filter double poles existing in CCM operation disappear, and the control-to-output transfer function looks like a single pole at DCM. The transfer function determines the loop gain and the transient response.

Figure 11:
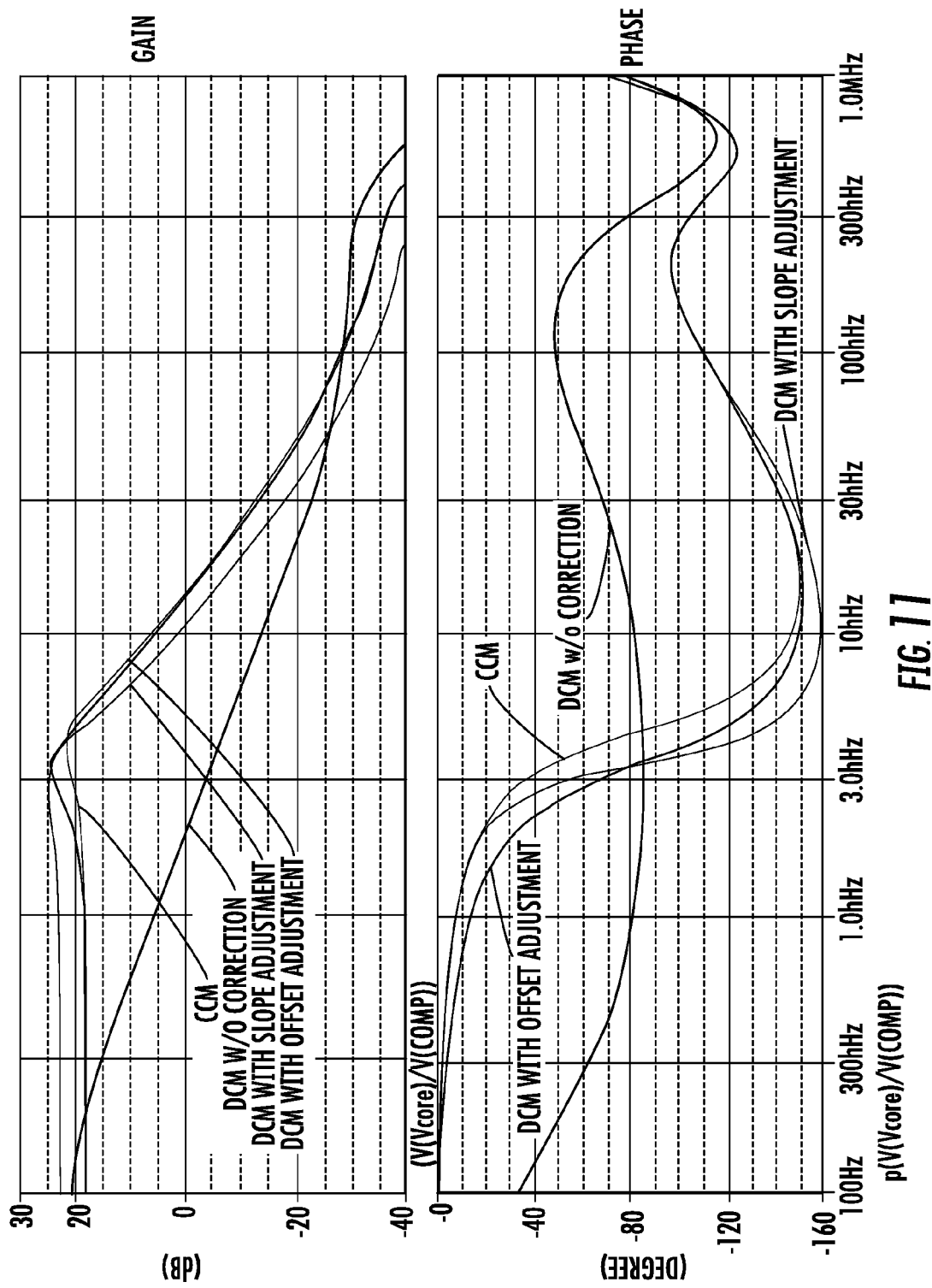
FIG. 11 shows simulated gain and phase plots comparing regulators according to the invention having comp voltage shift cancellation compared to conventional regulators.

Controllers and regulators therefrom according to the present invention having comp voltage shift cancellation circuitry provide a control-to-output transfer function at DCM that is pushed to close to that at CCM. As a result, the present invention can boost the dynamic performance at DCM as evidence by the simulation showing gain and phase plots shown in FIG. 11.

Transient Response Simulation Data

The transient response and the settle-down time depend on the zeros and poles in the closed loop system. Since the control-to-output transfer function is different at DCM operation, the output voltage waveform will be different when the load changes between a heavy and a light condition.

Figure 12:
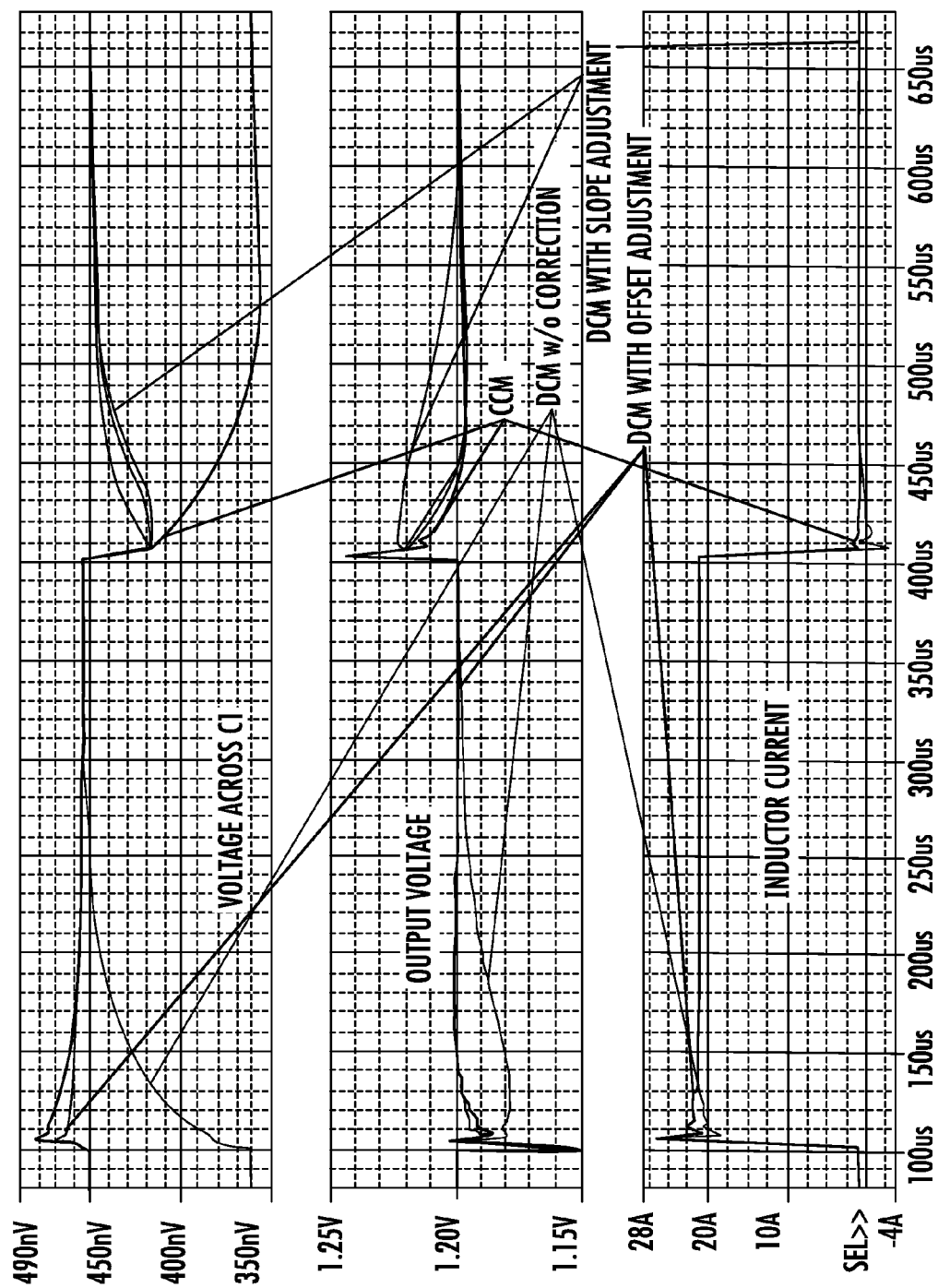
FIG. 12 shows simulated transient response data for the average COMP voltage (shown as voltage across C1), output voltage and inductor current.

The voltage across C1 in FIG. 12 represents the average COMP voltage. Using the invention, the average COMP voltage can be kept almost constant. In contrast, without comp voltage shift cancellation according to the present invention, circuit, the average COMP voltage moves over 100 mV.

Regarding settle-down time, regulators including comp voltage shift cancellation circuitry according to the present invention achieve similar transient response and settle-down time at DCM operation as with CCM. In comparison, when the comp voltage shift cancellation circuitry is not provided, the settle-down time is seen to be much longer with a much larger output voltage and inductor current deviation during the settle-down duration.

In the preceding description, certain details are set forth in conjunction with the described embodiment of the present invention to provide a sufficient understanding of the invention. One skilled in the art will appreciate, however, that the invention may be practiced without these particular details. Furthermore, one skilled in the art will appreciate that the example embodiments described above do not limit the scope of the present invention and will also understand that various modifications, equivalents, and combinations of the disclosed embodiments and components of such embodiments are within the scope of the present invention. For example, although mode switching according to the present invention has been described based on load current, this invention is not limited to mode switching based on load current. In one example, mode switching can be based on a voltage level, such as based on the voltage level of the COMP signal output by EA 108. In this embodiment, a voltage threshold can be set for the COMP signal. When COMP signal is lower than the threshold, the clock signal which initiates the start the PWM pulse is held off. Once the COMP signal is higher than the threshold, the clock signal triggers the PWM pulse.

Moreover, embodiments including fewer than all the components of any of the respective described embodiments may also within the scope of the present invention although not expressly described in detail. Finally, the operation of well known components and/or processes has not been shown or described in detail below to avoid unnecessarily obscuring the present invention.

One skilled in the art will understood that even though various embodiments and advantages of the present Invention have been set forth in the foregoing description, the above disclosure is illustrative only, and changes may be made in detail, and yet remain within the broad principles of the invention. For example, some of the components described above may be implemented using either digital or analog circuitry, or a combination of both, and also, where appropriate may be realized through software executing on suitable processing circuitry. The present invention is to be limited only by the appended claims.

Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A modulation controller for a switching regulator having an output voltage ($V_{OUT}$) and providing a load current, comprising:
   an error amplifier which receives a reference voltage and a feedback voltage proportional with the output voltage ($V_{OUT}$) at its inputs and provides a $V_{COMP}$ signal at its output;
   at least one comparator, a first input of the comparator coupled to an output of the error amplifier and a second input coupled to receive a ramp signal;
   a $V_{COMP}$ shift cancellation circuit generating a $V_{COMPADJ}$ signal based on the $V_{COMP}$ signal and on a difference in duty cycle ($\Delta D$) between a duty cycle while the switching regulator being controlled is in discontinuous conduction mode (DCM) and the duty cycle while the switching regulator being controlled is in continuous-conduction-mode (CCM); and
   wherein the $V_{COMP}$ shift cancellation circuit reduces a variation in average $V_{COMP}$ due to load current changes.

2. The controller of claim 1, further comprising a pulse timing circuit, wherein an output of the comparator is coupled to a first input of the pulse timing circuit, a second input of the pulse timing circuit coupled to receive a timing signal, an output of the pulse timing circuit providing a modulation signal.

3. The controller of claim 2, wherein the pulse timing circuit comprises a Set-Reset (SR) flip-flop.

4. The controller of claim 1, wherein the $V_{COMPADJ}$ signal is generated by multiplying a peak-to-peak (pk-pk) voltage of said ramp signal with said $\Delta D$.

5. The controller of claim 1, wherein the $\Delta D$ is generated from a time duration of the zero inductor current state during DCM operation.

6. The controller of claim 5, wherein the $\Delta D$ is obtained by ratioing the duration having zero inductor current by a total inductor conduction duration.

7. The controller of claim 1, wherein the $V_{COMP}$ shift cancellation circuit is interposed between the ramp signal and the second input of the comparator.

8. The controller of claim 7, wherein the ramp signal is an up-ramp signal, the $V_{COMP}$ shift cancellation circuit providing a current source which implements ramp slew rate adjustment for said up-ramp signal.

9. The controller of claim 1, wherein the $V_{COMP}$ shift cancellation circuit comprises a voltage divider, a divider ratio of the voltage divider being adjusted based on a conduction duration of inductor current provided by the switching regulator.

10. A switching regulator, comprising:
    a modulation controller, comprising:
        an error amplifier which receives a reference voltage and a feedback voltage proportional with an output voltage of the regulator ($V_{OUT}$) controlled by the modulation controller at its inputs and provides a $V_{COMP}$ signal at its output;
        at least one comparator, a first input of the comparator coupled to an output of the error amplifier and a second input coupled to receive a ramp signal, wherein a $V_{COMP}$ shift cancellation circuit is coupled to at least one of the first or the second input of the comparator, the $V_{COMP}$ shift cancellation circuit comprising:
            a summing node, the summing node receiving the $V_{COMP}$ signal and an adaptive $V_{COMP}$ offset voltage signal and outputting an adjusted $V_{COMP}$ signal ($V_{COMPADJ}$);
            wherein the $V_{COMP}$ shift cancellation circuit reduces a variation in average $V_{COMP}$; and
        a pulse timing circuit, wherein an output of the comparator is coupled to a first input of the pulse timing circuit, a second input of the pulse timing circuit coupled to receive a timing signal, an output of the pulse timing circuit providing a modulation signal;
    at least one driver having an input coupled to receive the modulation signal and an input to receive a mode select signal, the mode select signal causing the driver to determine whether the regulator is in discontinuous conduction mode (DCM) or continuous-conduction-mode (CCM), and
    an output stage comprising at least one output transistor having an input coupled to an output of the driver, the output transistor adapted for driving an inductor in series with a grounded capacitor, wherein $V_{OUT}$ signal is at a node between the inductor and the capacitor, the $V_{OUT}$ signal generating a load current across a load when connected across the capacitor.

11. The regulator of claim 10, wherein the adaptive $V_{COMP}$ offset voltage signal is based on a difference in duty cycle (ΔD) between a duty cycle while the regulator is in the DCM and the duty cycle while the regulator is in the CCM.

12. A method of controlling a voltage regulator to improve discontinuous conduction mode (DCM) performance, comprising the steps of:
   providing a modulation controller having an error amplifier which receives a reference voltage and an output voltage ($V_{OUT}$) from a regulator being controlled by the controller at its inputs and provides a $V_{COMP}$ signal at its output, and at least one comparator, a first input of the comparator coupled to an output of the error amplifier and a second input coupled to receive a ramp signal, and
   during operation of the regulator, wherein the regulator switches between DCM and continuous-conduction-mode (CCM), performing $V_{COMP}$ shift cancellation while in the DCM by generating an offset voltage based on a duty cycle difference between the CCM and the DCM and adding the offset voltage to the $V_{COMP}$ signal, wherein the $V_{COMP}$ shift cancellation reduces a variation in average $V_{COMP}$ during said DCM.

13. The method of claim 12, wherein performing $V_{COMP}$ shift cancellation further comprises adjusting a slew rate of the ramp signal.

14. The method of claim 12, wherein performing $V_{COMP}$ shift cancellation further comprises:
   obtaining a ratio of a duty cycle in the DCM and a duty cycle in the CCM; and
   generating a divider ratio adjustment for the $V_{COMP}$ signal using the ratio.

15. The controller of claim 1, wherein the $V_{COMP}$ shift cancellation circuit comprises a summing node, the summing node receiving the $V_{COMP}$ signal and an adaptive $V_{COMP}$ offset voltage signal.

16. A method of controlling a voltage regulator to improve discontinuous conduction mode (DCM) performance, comprising the steps of:
   providing a modulation controller having an error amplifier which receives a reference voltage and an output voltage ($V_{OUT}$) from a regulator being controlled by the controller at its inputs and provides a $V_{COMP}$ signal at its output, and at least one comparator, a first input of the comparator coupled to an output of the error amplifier and a second input coupled to receive a ramp signal; and
   performing $V_{COMP}$ shift cancellation while in the DCM, when the regulator switches between DCM and continuous-conduction-mode (CCM) during operation of the regulator, wherein the $V_{COMP}$ shift cancellation reduces a variation in average $V_{COMP}$ during said DCM, comprising:
      obtaining a ratio of a duty cycle in the DCM and a duty cycle in the CCM; and
      generating a divider ratio adjustment for the $V_{COMP}$ signal using the ratio.

* * * * *